3,058,956
ADDITIVE IMPROVING LUBRICATING COMPOSITIONS AND PROCESS OF PREPARING THEM

Robert Tirtiaux, Notre-Dame-de-Gravenchon, and Roger Tourret, Bolbec, France, assignors to Esso Research and Engineering Company, a corporation of Delaware
No Drawing. Filed May 7, 1959, Ser. No. 811,524
Claims priority, application France May 23, 1958
6 Claims. (Cl. 260—78.5)

The present invention relates to compounds suitable as additives for lubricating or fuel oils, and to compositions containing such additives.

It is generally necessary to add various additives to lubricating oils used as lubricants for internal combustion engines, to improve their viscosity index and pour point and other characteristics. Other additives are, for example, detergents, which prevent the accumulation of sludge within the engine. Ashless detergents i.e. non-metal-containing compounds, are especially useful as they leave no deposit in the combustion chamber, plugs or valve seats.

It has now been found that improved compounds especially useful for use in lubricating oils may be prepared by polymerizing or copolymerizing an amino ester of general formula:

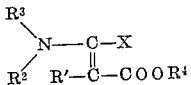

where X is $COOR^5$ or $R^5$, and $R'$, $R^2$, $R^3$, $R^4$ and $R^5$ are hydrogen or a substituted or unsubstituted straight or branched chain hydrocarbon radical, provided that at least one ester group is present. Suitable substituents for the hydrocarbon radical are, for example, —OH, —OR, —SH, —CN, —$NH_2$, —$CO.NH_2$, —COOH, —Cl, —Br or —I.

The amino esters may be prepared by hydrolysing and esterifying a chlorinated unsaturated mono- or di-carboxylic acid or acid anhydride, reacting the hydroxy-ester with ammonia or amines and dehydrating the reaction product to obtain the amino-ester. Alternatively the chlorinated esters may be treated directly with ammonia or amines.

The amino esters may be copolymerized with one or more polymerisable organic compounds, for example, unsaturated esters, such as mono- and di-esters of unsaturated dicarboxylic acids, e.g. maleofumarates; esters of unsaturated fatty acids; and esters of unsaturated alcohols, such as vinyl esters, e.g. vinyl acetate. These esters may contain various substituents, such as for example, alkoxy groups. Other polymerisable organic compounds suitable for copolymerisation with the amino-esters are unsaturated hydrocarbons, e.g. styrene, unsaturated nitriles, e.g. acrylonitrile, and unsaturated dicarboxylic acid anhydrides, e.g. maleic anhydride.

The polymerisation or copolymerisation may be effected in various ways, for example, by the use of heat and increased pressure with or without a catalyst. Examples of suitable catalysts are peroxide-type catalysts and azo-catalysts such as azodiisobutyronitrile. Solvents may be present during the polymerisation or copolymerisation reaction, for example, various hydrocarbons, especially aromatic hydrocarbons such as benzene; chloroform; and carbon tetrachloride. If desired the amino esters may be dissolved in a paraffinic or naphthenic oil during the reaction.

The additives of the present invention may be incorporated into lubricating oils to obtain lubricating compositions having improved detergency and antioxidant properties, higher viscosity index and lower pour point.

The lubricating compositions may contain from 0.01 to 20%, preferably 1 to 5% by weight, based on the total weight of the composition, of the polymer or copolymer additives. However, oil concentrates containing up to 80% of the additive compound may be used to add to lubricating oils.

The lubricating oils of the present invention may be mineral or synthetic oils. The mineral oils may be petroleum oils such as paraffinic, naphthenic or asphaltic oils or mixed base oils.

Various optional ingredients such as antioxidants, e.g. sulphur-containing alkyl phenol salts of metals, e.g. barium octyl phenol sulphide, may be added to the lubricating compositions.

The additives of the present invention may also be used for stabilising fuel oils, for flotation agents, dispersants for insecticides, additives for natural and synthetic rubber, carbon black dispersion agents, vulcanization accelerators and for dispersion agents for asphalt and linoleum.

The following examples will better show the scope and importance of the invention.

For these examples a product according to the invention was prepared as follows:

Maleic anhydride was chlorinated at 140° C. in the presence of a catalyst and the substance thus obtained was hydrolysed and esterified at 120° C. by a $C_8$ aliphatic alcohol.

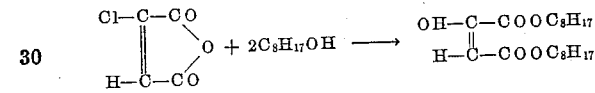

This hydroxy-ester was reacted with ammonia at 40° C. and then dehydrated at 120° C. so as to obtain the amino ester:

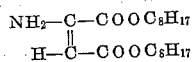

The following mixture was then copolymerised at 75° C. for 5 hours in the presence of 0.5 gram benzoyl peroxide:

|   | G. |
|---|---|
| Fumarate of natural $C_8$ alcohols | 40 |
| Fumarate of natural $C_{16}$ alcohols | 10 |
| Amino ester prepared as above | 10 |
| Vinyl acetate | 40 |

A paraffinic mineral oil was then added to the copolymer so as to obtain a 33% solution of this copolymer in oil; this solution had a viscosity at 99° C. of 897 centistrokes and is hereinafter referred to as copolymer A.

Example I

When copolymer A was added to a paraffinic oil of viscosity index 112 the following results were obtained:

| Percent of copolymer A (as percent active constituent) | Characteristics of oil according to percent of copolymer A | | |
|---|---|---|---|
|  | Viscosity Index | Viscosity at 99° C. | Pour Point, ° C. |
| 0 | 112 | 5.3 | −9 |
| 0.5 | 129 | 5.8 | −15 |
| 1 | 142 | 6.9 | −21 |
| 2 | 150 | 9.1 | −30 |
| 4 | 155 | 13.6 | −36 |

Example II

The detergent properties of the additive according to the invention were demonstrated by the following test.

10 g. dried mud extracted from a spent engine (motor)

oil were suspended in 90 g. oil. This formation of a suspension was carried out in a test tube by constant stirring at a temperature of 93° C. The mixture was then allowed to settle for 24 hours, keeping it at a temperature of 93° C. After this settling time ¼ of the total volume of the oil was tapped from the upper part of the test tube. The tapped oil was diluted with hexane so as to make up a total volume of 100 cc. and then the mixture was centrifuged. The volume of sludge $V_1$ which was in suspension at the upper part of the test tube was then determined. The efficacy of the additive was measured by the ratio between the volume of sludge in suspension and the volume of sludge introduced, initially $V_0$.

$$\text{Efficacy} = \frac{V_1}{V_0} \times 100$$

The test was repeated using an oil containing copolymer A.

The following table shows the results obtained:

Oil used:

| | Efficacy |
|---|---|
| Paraffinic oil of viscosity 5.3 centistokes at 37.8° C. and viscosity index 112 | 0 |
| Oil+1% copolymer A (active constituent) | 35 |
| Oil+2% copolymer A (active constituent) | 80 |

*Example III*

A motor test was carried out with a mineral oil containing copolymer A and the same mineral oil without additive.

The test was conducted according to the standard CRC F1–2 (co-ordination research council) test adapted for Peugeot engine 203 (4 cylinders, bore 75 mm., stroke 73 mm., total cylinder capacity 1290 cc., volumetric compression 6.8, speed 2500 r.p.m.); time of test 50 hours, output 20 H.P.

| | ° C. |
|---|---|
| Oil temperature | 55 |
| Water temperature: | |
| Inlet | 33 |
| Outlet | 35 |

This test is of the type known as the cold test.

| Composition of oils by weight | Without additive | With additive |
|---|---|---|
| Paraffin oil of viscosity 5.3 centistokes at 99° and viscosity index 112, percent | 96.30 | 94.82 |
| Copolymer A (active constituent), percent | | 1.48 |
| Anti-oxidising agent: Octylphenol treated with $P_2S_5$ and neutralised with baryta, percent | 3.70 | 3.70 |
| Main characteristics of these oils: | | |
| Viscosity at 99° C. in centistokes | 5.3 | 11.9 |
| Viscosity index | 112 | 139 |
| Pour point, ° C | −9 | −24 |

The results of the motor test are as follows:

1. CLEANLINESS

The cleanliness of the engine parts listed below is given marks from 0 to 10, the mark 10 being given to parts having no deposit and the mark 0 to parts entirely covered with deposits.

| | Oil without additive | Oil with additive |
|---|---|---|
| Combustion chamber (deposits) | 6.9 | 8.7 |
| Rings | 7.0 | 9.9 |
| 2. Sludge deposits: | | |
| Grams on oil filter | 32 | 7.5 |
| Grams on crankshaft | 17 | 4.3 |

What is claimed is:

1. A hydrocarbon-oil-soluble ashless polymer, suitable for improving the viscosity index, pour point and detergency of a lubricating oil, of (1) an ester of $C_4$ unsaturated dicarboxylic acid and alcohol having about 8 to 16 carbon atoms, (2) an ester of vinyl alcohol and lower saturated fatty acid and (3) an amino diester of the formula:

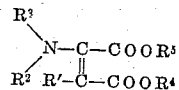

wherein $R^1$, $R^2$ and $R^3$ are selected from the group consisting of hydrogen and monovalent hydrocarbon radicals, and $R^4$ and $R^5$ are monovalent hydrocarbon radicals.

2. A polymer according to claim 1, wherein said ester of vinyl alcohol and said lower saturated fatty acid is vinyl acetate.

3. A polymer according to claim 1, wherein said $C_4$ unsaturated dicarboxylic acid is fumaric acid.

4. A polymer according to claim 1, wherein $R^1$, $R^2$, and $R^3$ are hydrogen, and $R^4$ and $R^5$ are hydrocarbon radicals of an aliphatic alcohol containing 8 carbon atoms.

5. A hydrocarbon-oil-soluble ashless polymer, suitable for improving the viscosity index, pour point and detergency of a mineral lubricating oil of (1) vinyl acetate, (2) ester of fumaric acid and $C_8$ to $C_{16}$ saturated aliphatic alcohol, and (3) amino diester of the formula:

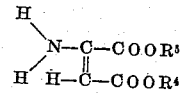

wherein $R^4$ and $R^5$ are monovalent saturated hydrocarbon radicals.

6. A method of preparing a polymer which comprises copolymerizing 40 parts of the ester of $C_8$ alcohol and fumaric aid, 10 parts of the ester of a $C_{16}$ alcohol and fumaric acid, 10 parts of amino diester having the formula:

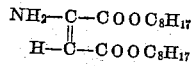

and 40 parts of vinyl acetate, at a temperature of about 75° C., for about 5 hours, and in the presence of benzoyl peroxide as a catalyst, wherein all parts are by weight.

References Cited in the file of this patent

UNITED STATES PATENTS

| 2,562,776 | Cypher et al. | July 31, 1951 |
| 2,698,316 | Giammaria | Dec. 28, 1954 |
| 2,800,452 | Bondi et al. | July 23, 1957 |
| 2,821,521 | Price | Jan. 28, 1958 |
| 2,892,788 | Stewart et al. | June 30, 1959 |